(12) United States Patent
Dieringer et al.

(10) Patent No.: US 6,427,961 B1
(45) Date of Patent: Aug. 6, 2002

(54) HOLDER FOR A BEVERAGE CONTAINER IN A MOTOR VEHICLE

(75) Inventors: Juergen Dieringer, Salzstetten; Roland Dettling, Horb-Untertalheim; Bernd Plocher, Rottenburg-Seebronn; Tilo Volkmann, Sindelfingen; Michael Kelz, Aidlingen, all of (DE)

(73) Assignee: Fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 09/717,446

(22) Filed: Nov. 21, 2000

(30) Foreign Application Priority Data

Nov. 25, 1999 (DE) .......................................... 199 56 649

(51) Int. Cl.$^7$ ................................................. A47K 1/08
(52) U.S. Cl. ..................... 248/311.2; 224/281; 224/926; 297/188.15
(58) Field of Search ....................... 248/311.2; 224/926, 224/281; 297/188.15

(56) References Cited

U.S. PATENT DOCUMENTS

| | | | | |
|---|---|---|---|---|
| 5,342,009 A | * | 8/1994 | Lehner | 248/311.2 |
| 5,762,307 A | * | 6/1998 | Patmore | 248/311.2 |
| 5,791,617 A | | 8/1998 | Boman et al. | 248/311.2 |
| 5,829,726 A | | 11/1998 | Withum | 248/311.2 |
| 5,845,888 A | * | 12/1998 | Anderson | 248/311.2 |
| 6,092,775 A | * | 7/2000 | Gallant | 248/311.2 |
| 6,234,438 B1 | * | 5/2001 | Plocher et al. | 248/311.2 |

FOREIGN PATENT DOCUMENTS

| DE | 44 29 515 C1 | 11/1995 |
|---|---|---|
| DE | 196 30 528 A1 | 2/1998 |
| DE | 198 21 313 A1 | 12/1999 |

\* cited by examiner

*Primary Examiner*—Ramon O. Ramirez
(74) *Attorney, Agent, or Firm*—Michael J. Striker

(57) ABSTRACT

A holder for a beverage container in a motor vehicle, has a beverage container receiver for insertion of a beverage container, a guide device for guiding the beverage container receiver a pivot point for pivoting back and forth between a non-use position and a use position, whereby a beverage container is insertable into the beverage container receiver in the use position, a movable support provided for moving the beverage container receiver and forming a blocking mechanism for the guide device of the beverage container receiver, which blocks lowering of the beverage container receiver in the use position.

8 Claims, 4 Drawing Sheets

HOLDER FOR A BEVERAGE CONTAINER IN A MOTOR VEHICLE

BACKGROUND OF THE INVENTION

The invention relates to a holder for a beverage container in a motor vehicle.

A holder of that kind is known from DE 198 21 313.1. The known holder has a beverage container receiver, which has an insertion opening for inserting a beverage container such as, for example, a cup, a beaker or a beverage can. The beverage container receiver is mounted on a carriage, which is guided in a vertical direction from a lowered position into a raised position. Instead of the slide guide element, there may also be provided, for example, a scissors guide element or the like. In the known holder, the beverage container receiver is so mounted on the carriage by means of a pivot joint that it can be pivoted from a non-use position into a use position, in which the beverage container can be inserted into the beverage container receiver. In the known holder, the angle of pivot of the beverage container receiver from the non-use position to the use is 90°. Other angles of pivot, for example 180°, are also possible.

SUMMARY OF THE INVENTION

The problem underlying the invention is therefore to construct a holder of the kind mentioned above which is stable when the beverage container receiver is in the user position.

In keeping with these objects and with others which will become apparent hereinafter, one feature of present invention resides, briefly stated, in a holder for a beverage container, in which the holder has a movable support for the beverage container receiver, which is moved into a support position supporting the beverage container and receiver on movement of the beverage container receiver into a raised position and/or on pivoting of the beverage container receiver into the use position, and at the same time the support forms a blocking mechanism for the guide device of the beverage container receiver, which blocks lowering of the beverage container receiver in the use position.

The holder according to the invention has a movable support, which supports the beverage container receiver in the raised, use position. By that means, the pivot joint, which otherwise is heavily loaded, has its load reduced. The support can be, for example, spring-loaded so that it moves into the support position automatically. The movement of the support into the support position can also be derived from the raising and/or pivoting of the beverage container receiver. Return of the support can be derived from the pivoting movement of the beverage container receiver into the non-use position. In as much as the movement of the support into the support position is derived from the raising or pivoting of the beverage container receiver, the return of the support can also be effected by spring force.

The support in the holder according to the invention at the same time forms a blocking mechanism, which blocks the guiding of the beverage container receiver in the raised position and, as a result, prevents unintentional lowering of the beverage container receiver. On pivoting of the beverage container receiver into the non-use position, the return movement of the support cancels its blocking action and allows the beverage container receiver to be lowered.

In an embodiment of the invention, the support has a pivot joint in order that it can be mounted on the holder so as to be capable of moving as desired.

In an embodiment of the invention, the beverage container receiver is made of two or, alternatively, more pieces. It has a movable piece, which is attached, for example displaceably or pivotally, to another piece of the beverage container receiver and which, when not in use, can be moved, at least partially, into that other piece. As a result, when not in use, the beverage container receiver can be accommodated in a relatively small space. In the use position, the movable piece of the beverage container receiver abuts a pivot block of the holder, as a result of which the beverage container receiver cannot be pivoted out of the use position into the non-use position when the movable piece of the beverage container receiver has been moved out from the other piece thereof. Because a beverage container inserted into the beverage container receiver prevents the movable piece of the beverage container receiver from being moved into the other piece thereof, this embodiment of the invention prevents pivoting of the beverage container receiver with a beverage container inserted.

In a development of the invention, the pivot block moves the movable piece of the beverage container receiver into the other piece of the beverage container receiver when the beverage container receiver is pivoted from the use position into the non-use position. Because the movable piece of the beverage container receiver, together with the pivot block, prevents pivoting of the beverage container receiver when a beverage container has been inserted, an inserted beverage container must be removed before the beverage container receiver is pivoted.

In an embodiment of the invention, the holder has a locking device, which keeps the beverage container receiver locked in the non-use position when it is in the lowered position and during raising. The locking device is unlocked at the end of raising of the beverage container receiver. In this embodiment of the invention, pivoting of the beverage container receiver during raising is prevented, which has the advantage that skewing or mis-positioning of the beverage container receiver and, as a result, jamming or catching on surrounding components are avoided when the beverage container receiver is being raised. The locking device sets a chronological sequence for initially raising and subsequently pivoting the beverage container receiver into the use position.

In an embodiment of the invention, the holder has a housing, on which the beverage container receiver is guided so that it can be raised. The housing has an opening for the beverage container receiver in its lowered and non-use position. When the beverage container receiver has been raised and pivoted into the use position, the opening in the housing is covered by a covering, especially by a cover flap pivotally mounted on the housing, in order to close the opening. The covering is opened as a result of pivoting of the beverage container receiver into the non-use position and/or lowering of the beverage container receiver opening of the covering is accordingly derived from the movement of the beverage container receiver; the covering does not need to be opened or closed manually.

The invention is described below in greater detail with reference to an exemplary embodiment illustrated in the drawing.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
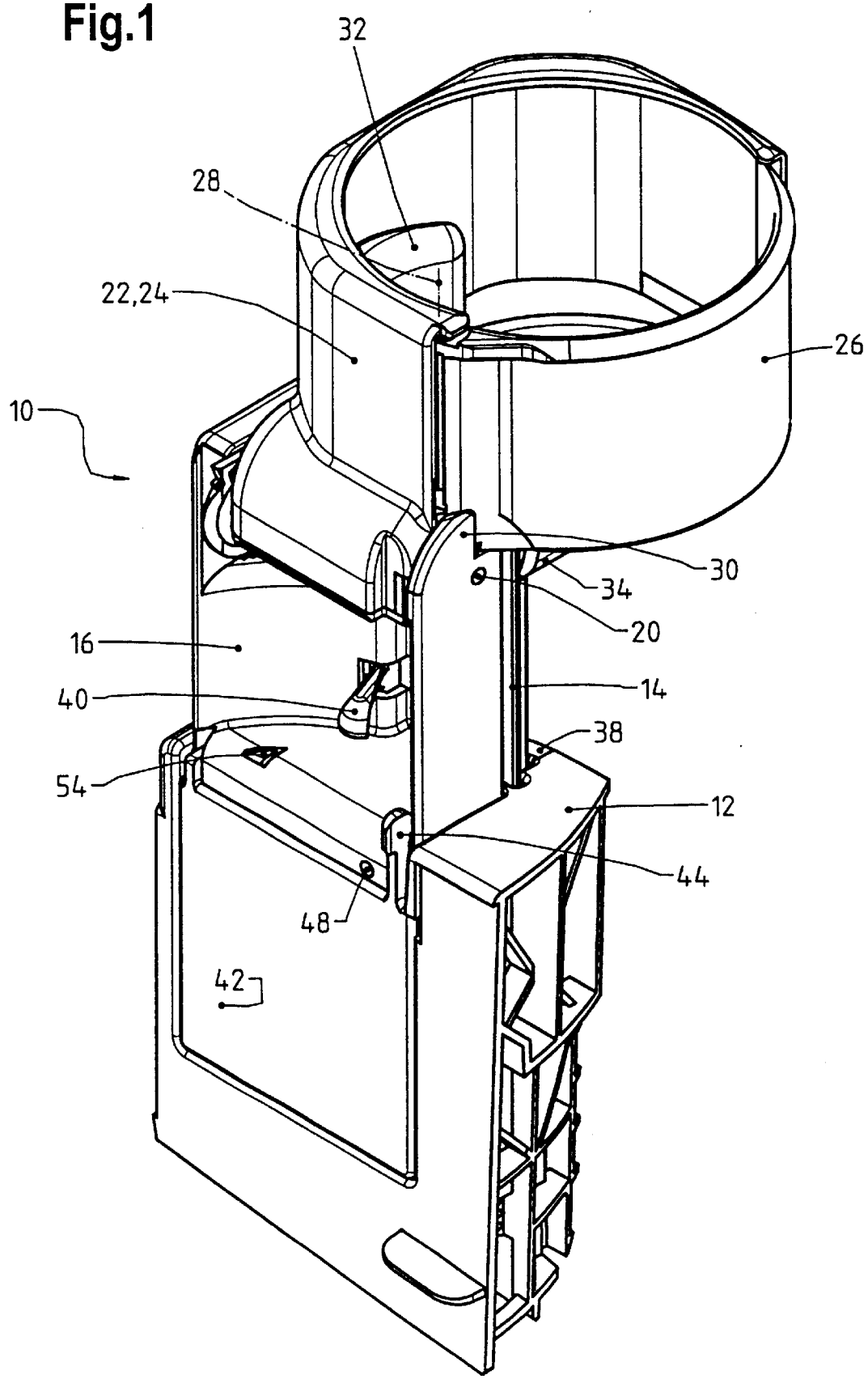
FIG. 1 shows a perspective view of a holder for a beverage container in a motor vehicle according to the invention in a use position.
Figure 2:
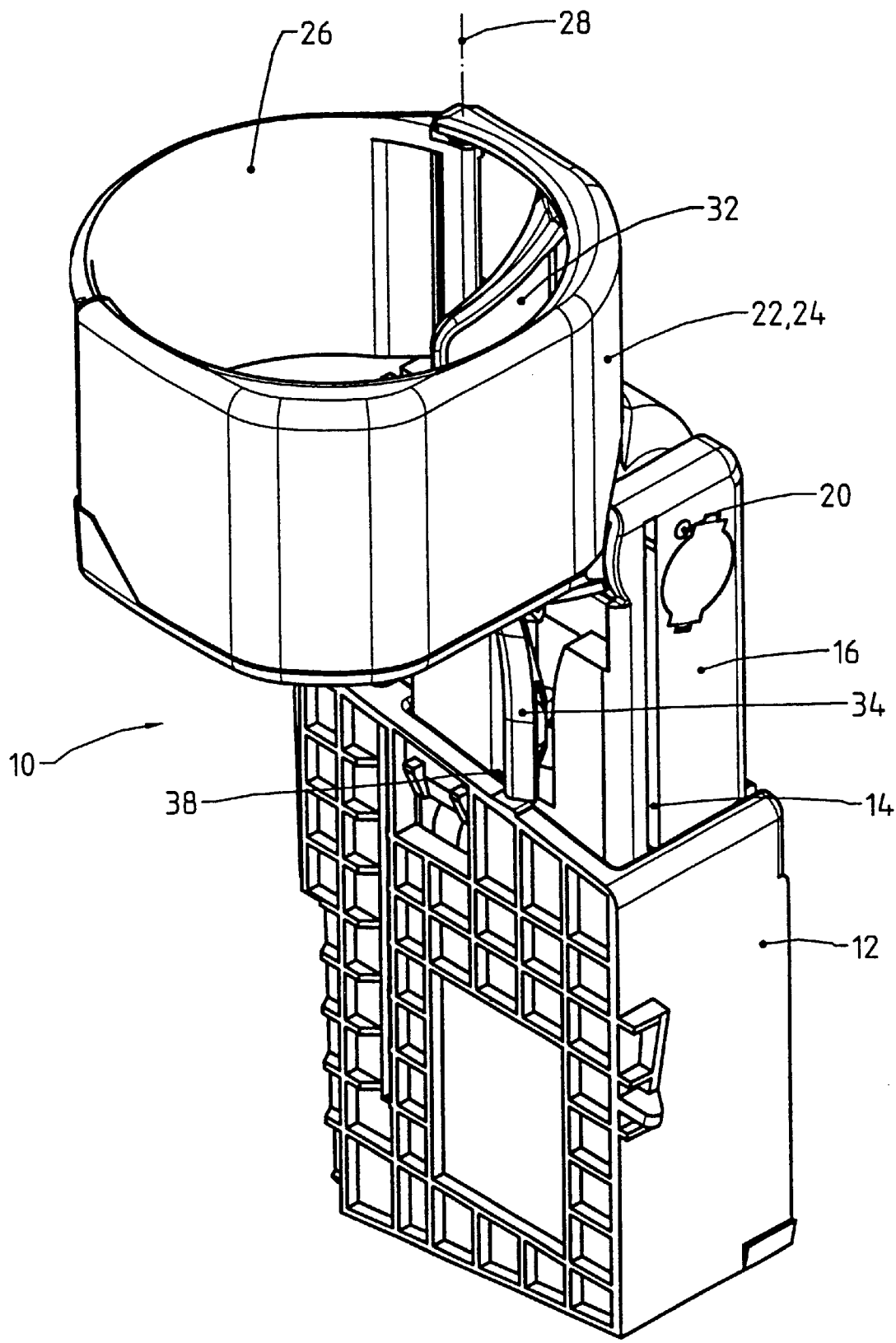
FIG. 2 shows a view of the holder for a beverage container in a motor vehicle of FIG. 1 from the opposite position.
Figure 3:
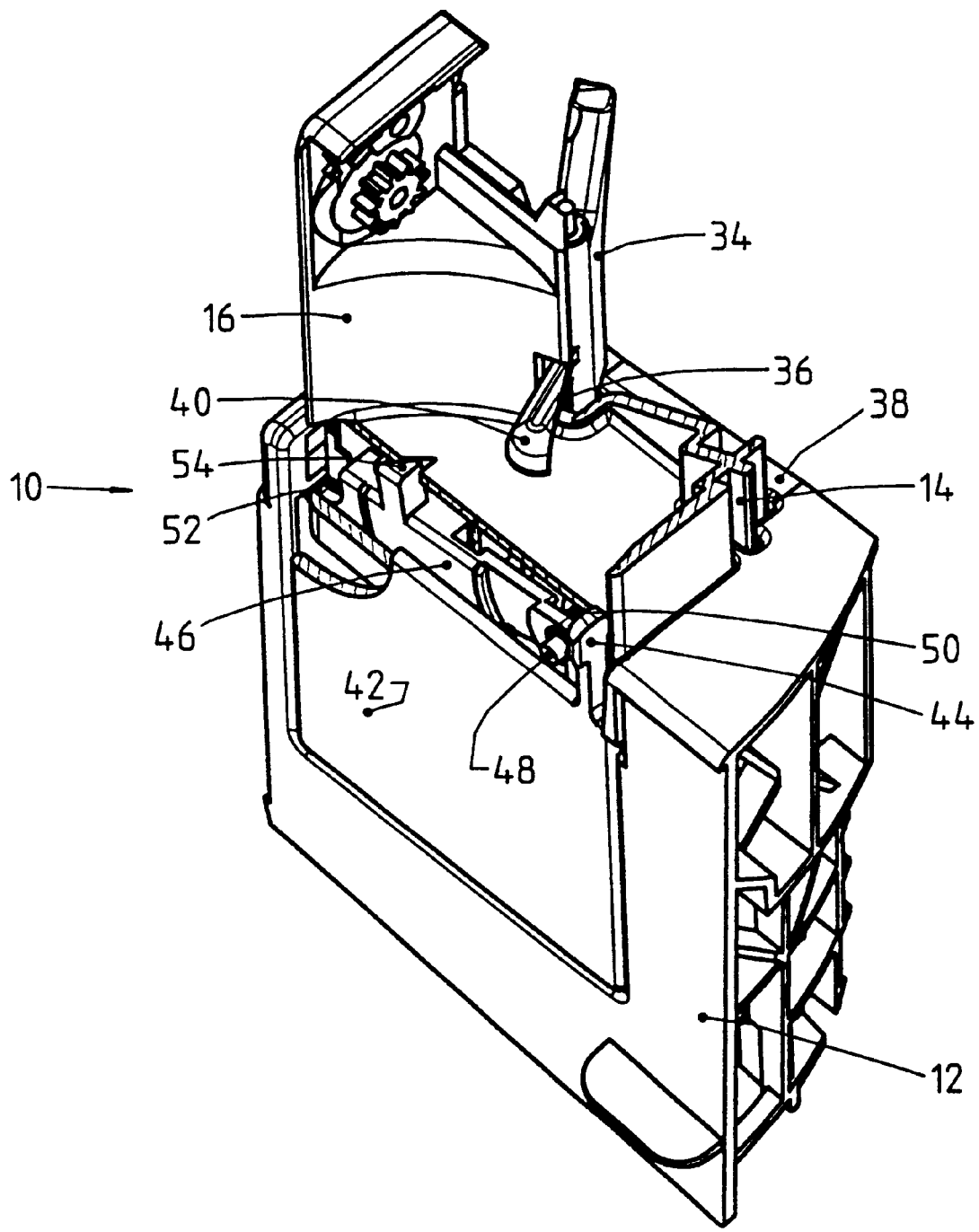
FIG. 3 shows the holder for a beverage container in a motor vehicle in a view according to FIG. 1 but cut away.
Figure 4:
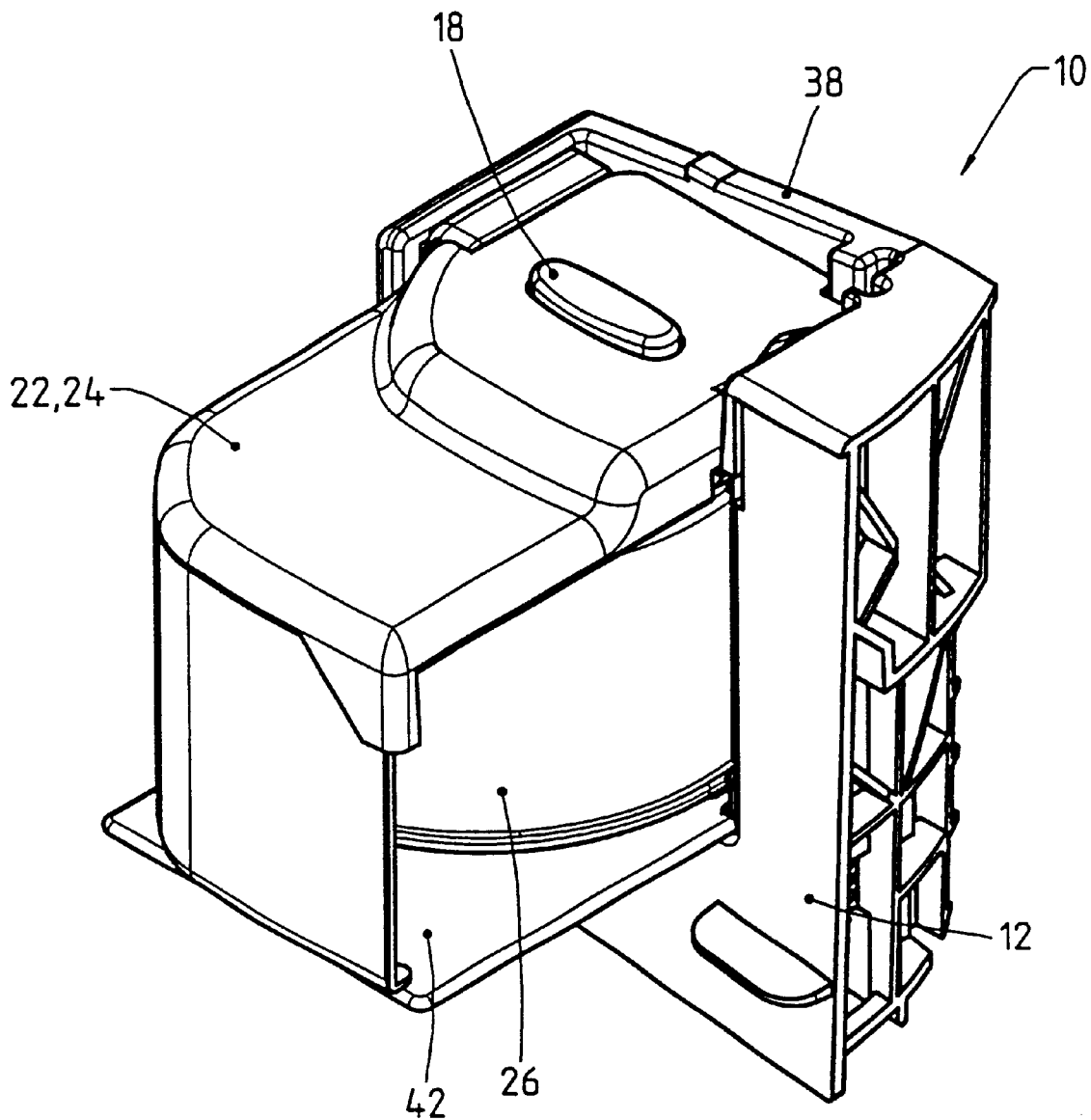
FIG. 4 shows the holder for a beverage container in a motor vehicle of FIG. 1 in a lowered, non-use position.

The holder 10 according to the invention shown in the drawings serves for insertion of a beverage container (not shown), such as, for example, a cup, a beaker or a beverage can. It is intended for recessed mounting in a motor vehicle, for example in a central console or in a position accessible from above in a door panel. The holder 10 has a housing 12 provided with an opening, which extends over an upper face and a side face of the housing 12. In the housing 12, a carriage 16 is so guided by means of a tongue and groove guide device 14 that it is displaceable in a vertical direction from a lowered position (FIG. 4) to a raised position (FIGS. 1 to 3). The carriage 16 is moved into the raised position by a scroll spring (tension spring) (not visible in the drawing). The carriage 16 is held in the lowered position by a locking device, which can be unlocked by means of a button 18 (FIG. 4). Such spring drives and locking devices will be familiar per se to the person skilled in the art and will not be described in greater detail herein because they do not constitute the actual subject of the invention.

A beverage container receiver 22 is so mounted on an upper face of the carriage 16 by means of a pivot pin connection 20 that it can pivot about a horizontal axis. The beverage container receiver 22 is pivoted in the use position shown in FIGS. 1 and 2 by a pivot spring element (again not visible in the drawing), for example a helical torsion spring, which will also be familiar to the person skilled in the art. In the use position, the beverage container (not shown) can be inserted into the beverage container receiver 22. The beverage container receiver 22 has approximately the shape of a non-circular tube having a base, on which the beverage container (not shown) is placed. The beverage container receiver 22 is made of two pieces, having a first piece 24 and a movable piece 26. The movable piece 26 is so mounted on the first piece 24 of the beverage container receiver 22 by means of a pivot pin connection that it can be pivoted about a pivotal axis 28 parallel to the axis of the beverage container receiver 22. The first piece 24 extends more than 180° in a peripheral direction; the movable piece 26 closes the beverage container receiver 22 in the peripheral direction. The movable piece 26 can be pivoted into the first piece 24 of the beverage container receiver 22 about the pivotal axis 28 against the force of a pivot spring element (not visible in the drawing) so that a width of the beverage container receiver 22 becomes narrower when not in use. FIG. 4 shows the position of the movable piece 26 pivoted into the first piece 24 of the beverage container receiver 22. In the position shown in FIG. 1, the movable pieces 26 abuts a nose 30 on the carriage 16. The nose 30 projects upwards from the carriage 16 and forms a pivot block 30 for the beverage container receiver 22. Because the movable piece 26 cannot be pivoted into the other piece 24 when a beverage container has been inserted into the beverage container receiver 22, the movable piece 26 abutting the pivot block 30 prevents pivoting of the beverage container receiver 22 about the pivot pin connection 20. If a beverage container has not been inserted into the beverage container receiver 22, the beverage container receiver 22 can be pivoted about the pivot pin connection 20 through 180° into the nonuse position shown in FIG. 4. During that pivoting, the nose 30 forming the pivot block 30 on the carriage 16 presses the movable pieces 26 of the beverage container receiver 22 into the other piece 24 of the beverage container receiver 22.

Mounted in the beverage container receiver 22 is a compensating flap 32, known per se, which can pivot and is spring-loaded, and which presses a beverage container inserted into the beverage container receiver 22 against the pieces 24, 26 of the beverage container receiver 22 in order to adapt the beverage container receiver 22 to beverage container of different diameters.

Mounted on the carriage 16, below the beverage container receiver 22, is a support 34 (FIGS. 2 and 3), which can be pivoted about a vertical axis. A pivot spring element in the form of a helical torsion spring 36 pivots the support 34 into the support position shown in FIGS. 1 to 3, wherein the support 34 stands out laterally from the carriage 16 and the beverage container receiver 22 lies on the support 34 and is supported by the support 34. In the support position pivoted out from the carriage 16, a lower face of the support 34 overlies an upper edge 38 of the housing 12 of the holder 10 according to the invention. By that means, the support 34, when in the support position, prevents the carriage 16 from being displaced downwards (lowered); at the same time, the support 34 forms a blocking mechanism for the carriage 16. When the beverage container receiver 22 is pivoted from the use position shown in FIGS. 1 and 2 through 180° into the non-use position shown in FIG. 4, the outer face of the beverage container receiver 22 presses against a nose 40 on the support 34 which extends through the carriage 22 presses against a nose 40 on the support 34 which extends through the carriage 16; the beverage container receiver 22 pivots the support 34, against the force of its pivot spring 36, into a position lying against the carriage 16 wherein the support 34 does not overlie the upper edge 38 of the housing 12 so that the carriage 16 can be moved downwards.

A lateral region of the opening in the housing 12 for the beverage container receiver 22 is covered by a cover flap 42. The cover flap 42 is so mounted on the carriage 16 by means of a pivot pin connection that it can be pivoted about a horizontal axis in the region of its upper edge. Projecting upwards from the cover flap 42 is a nose 44, which, on pivoting of the beverage container receiver 22 into the non-use position shown in FIG. 4, is pivoted to the side. As a result, the cover flap 42 is pivoted into the horizontal position shown in FIG. 4 lying against the beverage container receiver 22.

The holder 10 has a locking device, which blocks pivoting of the beverage container receiver 22 in the non-use position, provided that the carriage 16 is not in its upper position. The locking device has a blocking bar 46, which is so mounted on the carriage 16 that it can be pivoted about pivot pin 48. The blocking bar 46 is urged upwards by a pivot spring in the form of a helical torsion spring 50. When the carriage 16 is in the upper position (shown in FIGS. 1 to 3), a retaining nose 52 abuts a rib of the housing 12 and urges the blocking bar 46 downwards against the force of its pivot spring 50. If the carriage 16 is below its upper position, the pivot spring 50 urges the blocking bar 46 upwards, as a result of which a blocking lug 54 arranged on the upper face of the blocking bar 46 extends upwards out of the carriage 16. The blocking lug 54 engages behind an edge of the beverage container receiver 22, when the beverage container receiver 22 is in the non-use position, so that the latter does not pivot. When the carriage 16 reaches its upper position, the retaining nose 52 presses the blocking bar 46 downwards so that the blocking lug 54 on the blocking bar 46 disengages from the beverage container receiver 22 and the latter pivots into its use position (shown in FIGS. 1 and 2) under spring action.

It will be understood that each of the elements described above, or two or more together, may also find a useful application in other types of constructions differing from the types described above.

While the invention has been illustrated and described as embodied in holder for a beverage container in a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A holder for a beverage container in a motor vehicle, comprising a beverage container receiver for insertion of a beverage container; a guide device for guiding said beverage container receiver so that it is movable from a lowered position into a raised position and vice versa; a pivot point through which said beverage container receiver is arranged to be pivoted back and forth between a non-use position and a use position, whereby a beverage container is insertable into said beverage container receiver in the use position; a movable support for said beverage container receiver which is moved into a support position supporting said beverage container receiver on movement of said beverage container receiver into the raised position and/or on pivoting of said beverage container receiver into the use position, said support forming a blocking mechanism for said guide device of said beverage container receiver, which blocks lowering of said beverage container receiver in the use position.

2. A holder as defined in claim 1, wherein said support is formed so that as a result of pivoting of said beverage container receiver from the use position into the non-use position said support is moved to a side and its blocking action is canceled.

3. A holder as defined in claim 1, wherein said support has a pivot joint.

4. A holder as defined in claim 1, wherein said beverage container receiver is composed of at least two pieces including a movable piece arranged to be moved at least partially into another piece, so that in the use position of said beverage container receiver said movable piece of said beverage container receiver in a position moved out from the other piece of said beverage container receiver abuts a pivot block, so that said beverage container receiver is secured against pivoting.

5. A holder as defined in claim 4, wherein said pivot block is formed so that on pivoting of said beverage container receiver from the use position into the non-use position, said pivot block moves said movable piece of said beverage container receiver into said other piece of said beverage container receiver.

6. A holder as defined in claim 1, and further comprising a locking device which locks said beverage container receiver in the non-use position and is unlocked as a result of raising of said beverage container receiver at an end of raising.

7. A holder as defined in claim 1, and further comprising a housing having an opening in which said beverage container receiver is located at least partially in the lowered and non-use position; and a covering which covers an opening in said housing when said beverage container receiver has been raised and pivoted into the use position, said cover being openable by pivoting of said beverage container receiver into the non-use position and/or by lowering of said beverage container receiver.

8. A holder as defined in claim 7, wherein said covering is a cover flap pivotably mounted on said housing.

\* \* \* \* \*